Jan. 4, 1927.

C. J. KNAPP 1,613,036

COLLAPSING TAP

Filed July 30, 1923

Inventor
Charles J. Knapp
By
Attorney

Patented Jan. 4, 1927.

1,613,036

UNITED STATES PATENT OFFICE.

CHARLES J. KNAPP, OF ERIE, PENNSYLVANIA.

COLLAPSING TAP.

Application filed July 30, 1923. Serial No. 654,592.

The present structure is superior not only in simplicity and adaptability of the structure for all sizes of taps but it is particularly advantageous in its possibility for very small sizes of collapsing taps and also in that it permits of the cutters extending practically to the end of the tap so that a thread may be carried with a collapsing tap practically to the bottom of a screw socket as with an ordinary plug tap. These features and others described in the specification and claims form the objects of the invention.

The invention is illustrated in the accompanying drawings as follows:—

Figure 1:
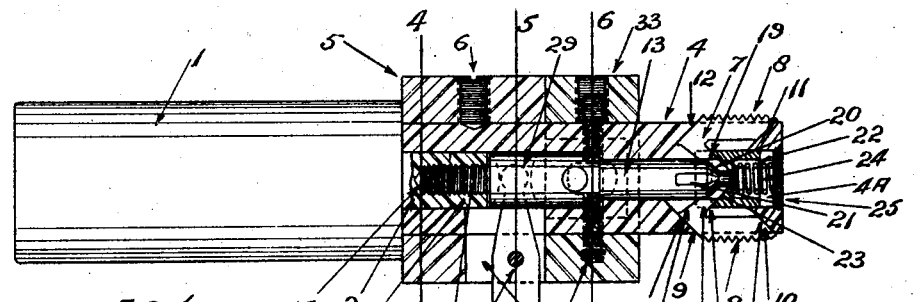
Figure 2:
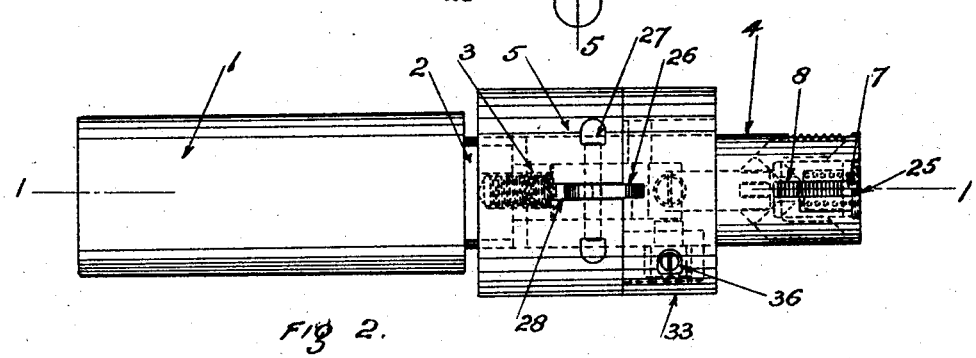

Fig. 1 shows a central section of the device on the line 1—1 in Fig. 2.

Fig. 2 a side elevation.

Figures 3, 4, 5, 6:
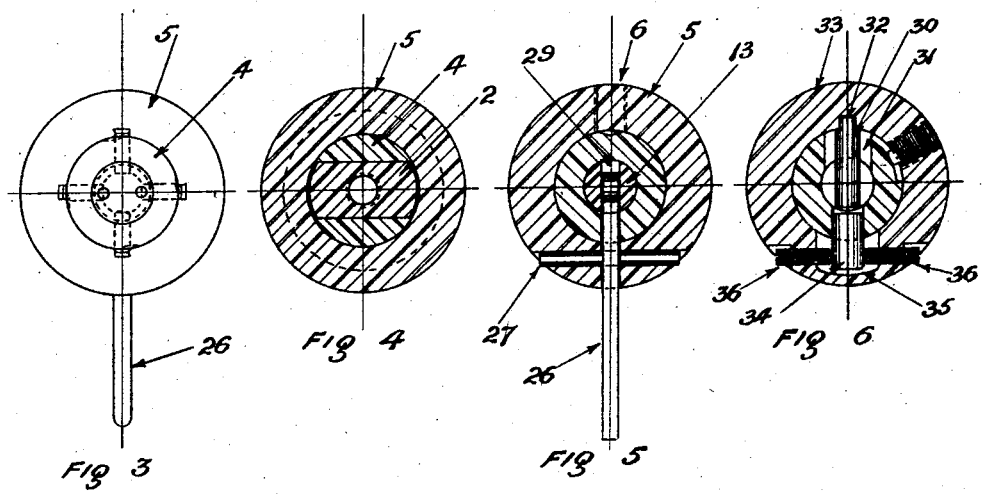

Fig. 3 an end view.

Fig. 4 a section on the line 4—4 in Fig. 1.

Fig. 5 a section on the line 5—5 in Fig. 1.

Fig. 6 a section on the line 6—6 in Fig. 1.

1 marks the head. This has a flat sided extension 2 with a cylindrical projection 3. A cutter holding sleeve 4 is mounted on the extension 2 having a socket conforming to the shape of the extension so that the sleeve is driven by the extension. The sleeve is slidingly mounted on the extension and has a collar 5 secured thereon by a screw 6, the collar moving with the sleeve and operating to all intents and purposes as an integral part.

The sleeve has the cutter holding slots 7 in which cutters 8 are arranged. The cutters have the beveled ends 9 and 10, these ends being parallel and slide against surfaces 11 and 12 at the ends of the slots 7. By this construction the end of the cutter may be brought flush with the extreme end of the holder so that the threads may be carried to the bottom of a screw threaded socket. This is possible because the inclination of the wall or end 11 furnishes metal for joining the holding sleeve and giving rigidity to the parts while the cutting edge or face of the cutter due to the bevel or inclination extends entirely to the end.

A cam and locking pin 13 has a screw-threaded end 14 which is secured in a screw threaded socket 15 in the projections 2 and 3 on the head, the pin thus being assembled and held rigid with the head. The cutters have the cam projections 16 with the rearward and forward cam surfaces 17 and 18, these cam surfaces being beveled or inclined relatively to the cutter in a reverse direction to the bevel of the ends of the cutter. The ends of the projections 16 have a surface 19 parallel with a cutting axis of the tap which forms a locking surface for locking the cutter in its outward position.

The cam and locking pin 13 has a cam surface 20 at its end which is adapted to engage the surface 17 of the cutters as they are moved rearwardly through the movement of the sleeve 4 and thus moves the cutters outwardly into operative position. The pin also has locking surfaces 21 on which the surfaces 19 are brought at the completion of the setting movement. These surfaces, therefore, lock the cutters in their outer position and hold them accurately to position.

In order to retract the cutters a cam plug 22 is slidably mounted in the end of an opening 4ª extending through the sleeve 4. It has the cam surfaces 23 acting on the surfaces 18 of the projections and is yieldingly held against said surfaces by a spring 24, the spring being locked in the socket or opening 4ª by a cap 25 screwed into the end of the socket. It will be noted that the plug 22 forms a guide and support for the end of the cam pin 13 and also even with the cutters in their outer position the plug still engages the surfaces 18 so as to prevent the disengagement or further outward movement of the cutters.

In order to move the sleeve to operate the cutters some sort of trip device is provided. In the present construction a lever 26 is pivoted on a pin 27 and extends through a slot 28 in the sleeve 4 and collar 5 into a slot 29 in the pin 13. The lever may be moved by hand to reset the tap, or by forcing the sleeve to the position shown in Fig. 1, or it may be arranged to engage a stationary part of the machine as the tap is retracted for automatically affecting this purpose.

In order to adjust the expanded position of the cutters it is desirable to have some means whereby the locking surfaces may be slightly varied to vary the adjustment. This is readily accomplished in the present structure as follows:—A pin 30 extends from the locking pin 13 outwardly through a slot 31 in the sleeve 4 into an opening 32 in a collar 33. A lug 34 extends outwardly from the sleeve 4 into a socket 35 in the collar 33. Adjusting screws 36 are arranged in the collar each side of the lug 34. By adjusting the screws 36 the collar may be swung on the sleeve 4 swinging the pin 13, the screw threads 14 permitting this, so as to vary slightly the position of the flats 21, these flats under these conditions acting as a cam so as to extend the axial movement outwardly slightly or inwardly slightly in order to accurately position the cutters.

In the operation of the device as the sleeve is drawn forward relatively to the pin 13 the surfaces 19 are carried off the locking surfaces 21 and the cutters permitted to retract inwardly, the cam action of the cam plug 22 together with whatever strain the cutters are subjected to affecting this movement. Upon a reverse of this movement of the sleeve 4 through the action of the lever 26 the cutters are forced outwardly by the cam surface 20 on the surface 17 and as these cutters are carried on to the locking surfaces locked in their outer position.

What I claim as new is:—

1. In a collapsing tap, the combination of a holder having radially extending slots, the end walls of the slots being parallel and inclined to the axis and opening at their outer ends adjacent to the end of the holder, the ends of the slots adjacent to the end of the holder being closed by a wall bridging the ends of the slots; cutters having beveled and parallel ends operating in the slots; and trip-actuated means positioning the cutters in the slots.

2. In a collapsing tap, the combination of a holder having radially extending slots, the end walls of the slots being parallel and inclined to the axis and opening at their outer ends adjacent to the end of the holder, the ends of the slots adjacent to the end of the holder being closed by a wall bridging the ends of the slots; cutters having beveled and parallel ends operating in the slots; and trip-actuated means positioning the cutters in the slots comprising devices moving the cutters outwardly and locking them in their outer position.

3. In a collapsing tap, the combination of a holder having radially extending slots, the end walls of the slots being parallel and inclined to the axis and opening at their outer ends adjacent to the end of the holder, the ends of the slots adjacent to the end of the holder being closed by a wall bridging the ends of the slots; cutters having beveled and parallel ends operating in the slots; and trip-actuated means positioning the cutters in the slots comprising devices moving the cutters outwardly and inwardly and locking them in their outer position.

4. In a collapsing tap, the combination of a holder having radially extending slots, the end walls of the slots being parallel and inclined to the axis and opening at their outer ends adjacent to the end of the holder, the ends of the slots adjacent to the end of the holder being closed by a wall bridging the ends of the slots; cutters having beveled and parallel ends operating in the slots; and trip-actuated means positioning the cutters in the slots comprising cam bevels on the cutters extending in a reverse direction from the ends of the cutters.

5. In a collapsing tap, the combination of a holder having radially extending slots, the end walls of the slots being parallel and inclined to the axis and opening at their outer ends adjacent to the end of the holder, the ends of the slots adjacent to the end of the holder being closed by a wall bridging the ends of the slots; cutters having beveled and parallel ends operating in the slots; and trip-actuated means positioning the cutters in the slots comprising cam bevels on the cutters extending in a reverse direction from the bevels on the ends of the cutters and a cam pin acting on the cam bevels and having an axially extending locking surface acting on the cutters to lock them in open position.

6. In a collapsing tap, the combination of a holder having radially extending slots, the end walls of the slots being parallel and inclined to the axis and opening at their outer ends adjacent to the end of the holder, the ends of the slots adjacent to the end of the holder being closed by a wall bridging the ends of the slots; cutters having beveled and parallel ends operating in the slots; trip-actuated means positioning the cutters in the slots comprising devices moving the cutters outwardly and locking them in their outer positions; and means adjusting the outward locked position of the cutters.

7. In a collapsing tap, the combination of a cutter having parallel beveled ends; the forward end forming an acute angle to the cutting face of the cutter; a holder having slots conforming to the shape of the cutter; means positioning the cutter in the slots comprising a cam bevel on the cutter extending in a reverse direction from the end of the cutter and a cam pin acting on the cam bevel and having a locking surface acting on the cutter to lock it in open position; and means acting on the pin adjusting the locking surface to adjust the outward locking position of the pin.

8. In a collapsing tap, the combination of a holder having radially extending slots, the end walls of the slots being parallel and inclined to the axis and opening at their outer ends adjacent to the end of the holder, the ends of the slots adjacent to the end of the holder being closed by a wall bridging the ends of the slots; cutters having beveled and parallel ends operating in the slots; double cam projections on each of the cutters having front and rear cam surfaces extending in a reverse direction from that of the ends of the cutters; and trip-actuated means acting on the cam surfaces for moving the cutters in and out to collapsed and expanded position.

9. In a collapsing cap, the combination of a holder having radially extending slots, the end walls of the slots being parallel and inclined to the axis and opening at their outer ends adjacent to the end of the holder, the ends of the slots adjacent to the end of the holder being closed by a wall bridging the ends of the slots; cutters having beveled and parallel ends operating in the slots; double cam projections on each of the cutters having front and rear cam surfaces extending in a reverse direction from that of the ends of the cutters; trip-actuated means acting on the cam surfaces for moving the cutters in and out to collapsed and expanded position; and means acting on the projections for locking the cutters in expanded position.

10. In a collapsing tap, the combination of a head; a holder sleeve locked against rotation relatively to the head but slidingly mounted thereon; a cam pin extending from the head; a lever acting on the pin and sleeve to effect a relative movement thereto, said sleeve having cutter slots therein having beveled ends; cutters in the slots conforming to the shape of the slots and having parallel beveled ends, the cutters having cam projections having cam surfaces extending in a reverse direction from the beveled ends of the slots; cam surfaces on the cam pin acting on the projections for expanding the cutters; means on the pin for locking the cutters in expanded position; and a collapsing plug having a cam operating on the projections to retract the cutters.

11. In a collapsing tap, the combination of a head; a holder sleeve locked against rotation relatively to the head but slidingly mounted thereon; a cam pin extending from the head; a lever acting on the pin and sleeve to effect a relative movement thereto, said sleeve having cutter slots therein having beveled ends; cutters in the slots conforming to the shape of the slots and having parallel beveled ends, the cutters having cam projections having cam surfaces extending in a reverse direction from the beveled ends of the slots; cam surfaces on the cam pin acting on the projections for expanding the cutters; means on the pin for locking the cutters in expanded position; a collapsing plug having a cam operating on the projections to retract the cutters; and a spring acting on the plug for yieldingly actuating the same.

12. In a collapsing tap, the combination of a cutter; a holder sleeve having a slot in which the cutter is mounted; a cam pin operating to move the cutter outwardly, said cam pin having locking surfaces thereon for locking the cutter in expanded position; and means for rotating the sleeve relatively to the cam pin relatively to the plunger to vary the locking position to adjust the expanded position of the cutter.

In testimony whereof I have hereunto set my hand.

CHARLES J. KNAPP.